United States Patent
Chao

(10) Patent No.: US 6,485,697 B1
(45) Date of Patent: Nov. 26, 2002

(54) METHODS FOR REMOVING SULFUR CONTAINING COMPOUNDS AND CARBON DIOXIDE FROM GAS MIXTURES

(75) Inventor: I-Meen Chao, Overland Park, KS (US)

(73) Assignee: Eickmeyer & Associates, Overland Park, KS (US)

( * ) Notice: Subject to any disclaimer, the term of this patent is extended or adjusted under 35 U.S.C. 154(b) by 0 days.

(21) Appl. No.: 09/663,227

(22) Filed: Sep. 15, 2000

Related U.S. Application Data

(60) Provisional application No. 60/154,009, filed on Sep. 15, 1999.

(51) Int. Cl.[7] .................. B01D 53/52; B01D 53/62; C01B 17/04; C10L 3/10
(52) U.S. Cl. .............. 423/220; 423/224; 423/232; 423/233; 423/576.4; 423/576.5
(58) Field of Search .................. 423/220, 224, 423/232, 233, 576.4, 576.5

(56) References Cited

U.S. PATENT DOCUMENTS

| | | | |
|---|---|---|---|
| 3,907,969 A | * 9/1975 | Field | 423/223 |
| 4,400,361 A | * 8/1983 | Shafer | 423/226 |
| 4,421,733 A | 12/1983 | Blytas | 423/573 R |
| 4,430,312 A | 2/1984 | Eickmeyer | 423/223 |
| 4,434,143 A | * 2/1984 | Weber | 423/226 |
| 4,434,145 A | * 2/1984 | Weber | 423/226 |
| 4,460,554 A | 7/1984 | Shafer | 423/223 |
| 4,537,752 A | * 8/1985 | Weber | 423/224 |
| 4,871,468 A | 10/1989 | Jeffrey | 252/190 |
| 4,921,682 A | * 5/1990 | De Haan et al. | 423/225 |

FOREIGN PATENT DOCUMENTS

EP    0 066 306 A1    12/1982

OTHER PUBLICATIONS

Kohl et al. "Gas Purification" (4th ed.) Gulf Publishing Co. Houston TX USA, ISBN 0–87201–314–6, pp. 190–195 (1985).*

* cited by examiner

Primary Examiner—Stanley S. Silverman
Assistant Examiner—Timothy C. Vanoy
(74) Attorney, Agent, or Firm—Bryan Cave LLP

(57) ABSTRACT

Process for the removal of carbon dioxide ($CO_2$) and minor sulfur compounds—mainly hydrogen sulfide ($H_2S$)—from a sour gas mixture, such as natural gas, iron ore reduction gas, etc. The process uses a continuous absorption process with an alkaline aqueous liquid mixture containing 15–40% by weight of equivalent $K_2CO_3$ and is conducted at a temperature of about 150 degrees F. to 300 degrees F. The $H_2S$ is removed from the sour gas as elemental sulfur. A high concentration (at least 10 to 1 molar ratio) of penta-valent vanadium (V+5) to $H_2S$ is maintained at a high temperature (150 to 300 degrees F.) to help minimize thiosulfate formation, raise the absorption temperature, and increase the speed of conversion of $H_2S$ to elemental sulfur. $CO_2$ is stripped from the aqueous alkaline solution and vented directly into the atmosphere since the sulfur that usually contaminates the $CO_2$ was removed earlier in the process as elemental sulfur.

17 Claims, 2 Drawing Sheets

METHODS FOR REMOVING SULFUR CONTAINING COMPOUNDS AND CARBON DIOXIDE FROM GAS MIXTURES

This application is a continuation of a prior application, Ser. No. 60/154,009, filed Sep. 15, 1999.

BACKGROUND OF THE INVENTION

With an increasing concern over the pollution in the atmosphere, there is a great burden placed on industry to produce environmentally safe products and to do so in an environmentally safe manner. An area that has been of particular concern is the release of sulfur and sulfur compounds into the atmosphere during the refining of petroleum, the sweetening of natural gas, the processing of ore, the destructive distillation of coal, and other processes which produce sulfur containing gases.

The presence of significant quantities of hydrogen sulfide ($H_2S$) and carbon dioxide ($CO_2$) in various "sour" industrial gaseous streams poses a persistent problem. Although there are various procedures that have been developed to remove and recover these contaminants, these procedures are deficient in some way or another. For example, one process that has been developed utilizes aqueous alkaline solutions to absorb $H_2S$ from a gas stream and to convert the absorbed $H_2S$ to elementary. sulfur. Generally, this type of a process utilizes an aqueous alkaline solution containing vanadium ions and anthraquinone disulfonate, i.e., acid (ADA). This particular type of process, however, only works with dilute aqueous solutions and low $H_2S$ loading. A dilute aqueous solution is required because when higher concentrations are used, sufficient levels of vanadium that oxidize the sulfur compounds can not be maintained in solution. Low concentrations, however, result in high circulation rates, large capital investments, and higher production costs. In addition, a dilute aqueous alkaline solution is not capable of $CO_2$ removal.

Another problem associated with these processes is the breakdown and disposal of the ADA, an additive used in this type of process. The breakdown and disposal of this compound and compounds similar to it is difficult and expensive. Thus, adding ADA and/or ADA-like compounds actually increase the cost associated with this type of process.

Accordingly, there is a need for an improved process to control the removal of $H_2S$ and $C0_2$ from various "sour" gases in an economical and environmentally safe way. The improved process should be capable of removing $H_2S$ and $CO_2$ with solutions having adequate $H_2S$ loads without using harmful additives like ADA or ADA-like compounds. The present invention is directed to such an improved process.

SUMMARY OF THE INVENTION

The present invention relates to a process for the removal of minor sulfur compounds—mainly $H_2S$ and $CO_2$ from a gaseous mixture that contains the same. Examples of a gaseous mixture include natural gas, iron ore reduction gas, etc. The process contacts a sour gas mixture with an aqueous alkaline solution comprising an oxidizing agent in a 10 to 1 molar ratio of an oxidizing agent to $H_2S$ gas. The oxidizing agent is contacted with the gaseous mixture at a temperature of about 150 degrees F. to about 300 degrees F. so that the gaseous mixture is absorbed into the aqueous alkaline solution.

Once absorbed, $H_2S$ is oxidized by vanadium ions present in the aqueous alkaline solution into elementary sulfur. The elementary sulfur is removed from the aqueous mixture to produce an aqueous alkaline solution having less sulfur than the initial gaseous mixture absorbed into the aqueous alkaline solution. After $H_2S$ is removed from the aqueous alkaline solution as elementary sulfur, $CO_2$ is stripped from the aqueous alkaline solution to produce an aqueous alkaline solution containing less $H_2S$ and less $CO_2$ than the initial gaseous mixture absorbed into the aqueous alkaline solution.

The aqueous alkaline solution used in the process described above comprises about 15% to about 40% by weight of $K_2CO_3$, up to about 10% by weight of $V_2O_5$, and up to about 10% by weight of equivalent $H_3BO_3$ The pH of the aqueous alkaline solution is buffered at a pH below 10 and the pressure is maintained above atmospheric pressure. The pressure and temperature ranges maintained keep a more concentrated alkaline solution and, therefore, help to maintain the tetravalent vanadium ions from $V_2O_5$, above 65% of the total vanadium ions in the aqueous solution. This high percentage of tetravalent vanadium ions facilitates regeneration of spent $V^{+5}$ and, thus complete oxidization of the sulfur compounds in the aqueous gaseous mixture without the use of additives like ADA and/or ADA-like compounds.

DETAILED DESCRIPTION OF THE INVENTION

Figure 1:
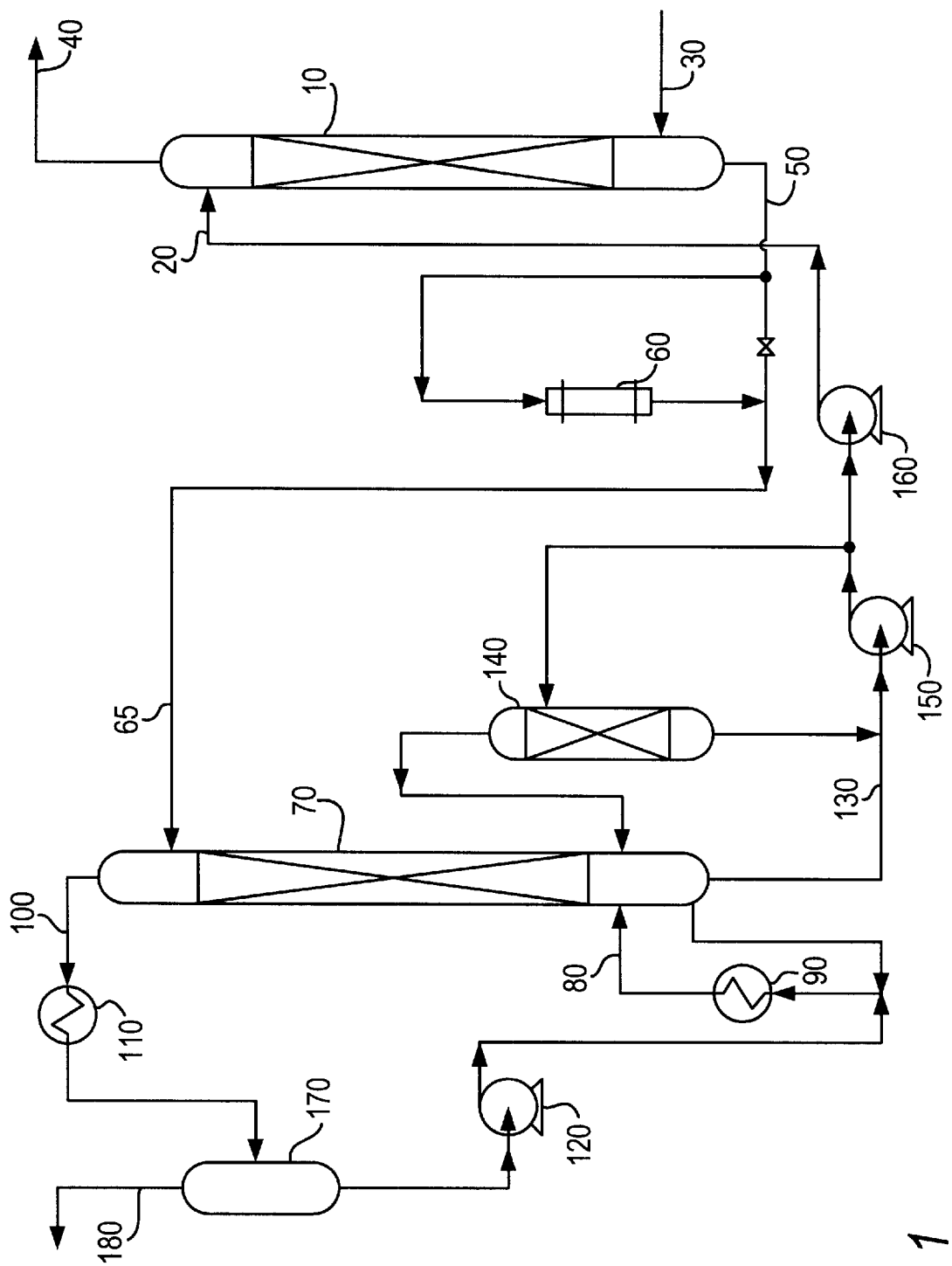
FIG. 1 is a schematic diagram of the flow of aqueous alkaline solution and gases associated with the improved process of the invention showing a separate oxidation chamber.

According to one aspect of the invention there is provided a continuous process for removing minor sulfur compounds—mainly $H_2S$—and $CO_2$ from a sour gas stream containing the same. The process comprises a step of contacting the sour gas mixture with an aqueous alkaline solution containing penta-valent vanadium ($V^{+5}$) as the oxidizing agent. In this process some of the $V^{+5}$ ions in solution are converted stoichementrically to tetra-valent vanadium ($V^{+4}$) facilitating the production of elementary sulfur.

The aqueous alkaline solution used in the process of the invention comprises about 15% to about 40% by weight of equivalent $K_2CO_3$, up to about 10% by weight of equivalent $V_2O_5$ and up to about 10% by weight of equivalent $H_3BO_3$. The aqueous alkaline solution preferably contains about 20% to about 30% by weight of equivalent $K_2CO_3$, about 0.5% to about 5% by weight of equivalent $H_3BO_3$. The solubility of $V^{+4}/V^{+5}$ ions is important in oxidizing $H_2S$ to elementary sulfur. The solubility of $V^{+4}/V^{+5}$ ions depends on the total alkalinity of the aqueous alkaline solution. To ensure a high alkalinity the aqueous alkaline solution of the present invention not only contains the alkalinity of $K_2CO_3$ but also contains up to 10% by weight of boric acid. This additional source of borate provides better stability of vanadium, especially against the pH variation of 8.5–11.0 usually associated with $CO_2$ absorption.

Although the increased alkalinity and thus the increased stability of vanadium increases the oxidation of $H_2S$ elementary sulfur, the reaction is fairly slow and thus demands a significant residence time after absorption. The slow reaction rate contributes to the production of undesirable by-products. It is well known that the removal of $H_2S$ from an aqueous solution may form undesirable by-products such as thiosulfate, which accumulates in the solution and reduces the activity of the solution. There are a number of factors that contribute to the production of these undesirable by-products. For example, the formation of thiosulfate depends on the content of $H_2S$ in solution, the pH of the solution, and the operative temperature of the solution during the process.

To better control the formation of thiosulfate known processes usually oxidize minor sulfide compounds such as $H_2S$ under low temperature and pH, i.e. below 120° F. and around pH of 8.5–9.5. Under such conditions, however, $V^{+4}/V^{+5}$ oxidation rate is very very slow. The process of the invention, instead uses excess $V^{+5}$ in the proposed aqueous alkaline solution to minimize thiosulfate productions. With excess $V^{+5}$, a higher absorption temperature in the Absorber is used to speed up the oxidation of the minor sulfide compounds such as $H_2S$ by $V^{+4}/V^{+5}$.

As shown in table A below, oxidation of $H_2S$ in an Absorber with 22.5% $K_2CO_3$ by weight at a temperature of 175° F. and a residence time of less than 8 minutes easily exceeds 99.5%.

OXIDATION OF $H_2S$ IN THE ABSORBER WITH 22.5% WT. $K_2CO_3$ SOLUTION AT 175°.

TABLE A

| OXIDATION OF H2S IN THE ABSORBER WITH 22.5% WT.K2CO3 SOLUTION AT 175° F. | | | | |
|---|---|---|---|---|
| TOTAL VANADIUM NORMAL OF V | H2S LOADING MG/LITER | V + 5 NORMAL | V + 4 NORMAL | CONVERSION % |
| 0.152 | 36 | 0.077 | 0.075 | 99.9 |
| 0.152 | 36 | 0.074 | 0.078 | 99.8 |

TABLE A-continued

| OXIDATION OF H2S IN THE ABSORBER WITH 22.5% WT.K2CO3 SOLUTION AT 175° F. | | | | |
|---|---|---|---|---|
| TOTAL VANADIUM NORMAL OF V | H2S LOADING MG/LITER | V + 5 NORMAL | V + 4 NORMAL | CONVERSION % |
| 0.152 | 36 | 0.068 | 0.086 | 99.9 |
| 0.152 | 72 | 0.134 | 0.018 | 99.7 |
| 0.152 | 72 | 0.079 | 0.073 | 99.6 |
| 0.152 | 72 | 0.066 | 0.086 | 99.6 |
| 0.247 | 72 | 0.201 | 0.046 | 99.9 |
| 0.247 | 72 | 0.158 | 0.089 | 99.6 |
| 0.247 | 72 | 0.123 | 0.124 | 99.5 |

With a reduced residence time and elevated temperature, thiosulfate formation is drastically reduced. Thus, thiosulfate formation is minimized using the aqueous alkaline solution of the invention under an elevated absorption temperatures, preferably between 150° F. and 300° F. More preferably, the absorption temperature range used in the present invention is 175° F.–250° F.

In addition, in order to speed up oxidation, the $V^{+4}$ concentration is kept high in the solution, i.e. above about 65% of the total vanadium ions, by contacting the solution with an oxygen containing gas, preferably air. Oxygen converts $V^{+4}$ back to $V^{+5}$. The optimum rate is obtained by keeping the $V^{+4}$ concentration above about 65%. Table B compares vanadium oxidation rate with $V^{+4}$ content in a solution containing 22.5% $K_2CO_3$ at 190° F. The results of Table B are also illustrated graphically. As shown in the graph accompanying Table B, under these conditions when 65% of the total vanadium ions are in the $V^{+4}$ form the oxidation rate of vanadium begins to plateau. Thus, in order to keep the $H_2S$ rate of oxidation fast, about 65% $V^{+4}$ should be maintained.

TABLE B/GRAPH

| VANADIUM OXIDATION RATE VS. V+4 CONTENT WITH 22.5% K2CO3 SOLUTION AT 190° F. | | | | | | |
|---|---|---|---|---|---|---|
| TOTAL VANADIUM NORMAL OF V | AIR RATE SCF/1000 GAL | V+5 NORMAL | V+4 NORMAL | OXIDATION RATE MG/HR | RAI % | REL RATE |
| 0.375 | 548 | 0.098 | 0.277 | 5310 | 74% | 1.48 |
| 0.375 | 548 | 0.135 | 0.240 | 5127 | 64% | 1.43 |
| 0.375 | 548 | 0.175 | 0.201 | 3590 | 54% | 1.00 |

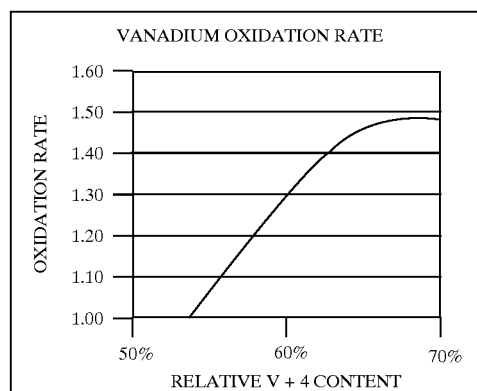

It is also well known that the oxidation rate of vanadium is dependent on operating temperature. Table C shows the effect of temperature on vanadium oxidation. The results of Table C are also illustrated graphically. As shown in the graph accompanying Table C, the oxidation rate of vanadium at 210° F. is 230% of that of 100° F. Keeping the temperature high, therefore, easily oxidizes $V^{+4}$ without the addition of any additive for oxidation, such as (ADA), aromatic compounds, or amines.

TABLE C/GRAPH

VANADIUM OXIDATION RATE VS. TEMPERATURE

| TEMPER-ATURE F. | REL R | V+5 N | V+4 N | REL V+4 % | OXIDATION RATE MG/L/HR |
|---|---|---|---|---|---|
| 100 | 1.00 | 0.059 | 0.033 | 38% | 203 |
| 140 | 1.33 | 0.061 | 0.031 | 34% | 271 |
| 180 | 1.75 | 0.068 | 0.026 | 28% | 355 |
| 210 | 2.33 | 0.059 | 0.035 | 37% | 473 |

It is also noted that maintaining the pH of the aqueous alkaline solution below 10 has little impact on $V^{+4}$ oxidation. Where the pH is maintained above 10 the relative oxidation rate of $V^{+4}$ decreases rapidly. Table D and its accompanying graph shows how vanadium oxidation rate is effected by pH. As shown in the graph the relative rate of oxidation shapely decrease at a pH above 10. For this reason, the aqueous alkaline solution is buffered below a pH 10. In addition, to maintain pH below 10 preferably the alkaline solution should not be thoroughly stripped because stripping has the tendency to make the pH rise above 10.

TABLE D/GRAPH

OXIDATION RATE VS. SOLUTION PH AT 100 F.

| PH | REL RATE | AVG RATE MG/L/HR |
|---|---|---|
| 9.50 | 1.63 | 331 |
| 10.00 | 1.57 | 319 |
| 10.85 | 1.00 | 203 |

TABLE D/GRAPH-continued

OXIDATION RATE VS. SOLUTION PH AT 100 F.

| PH | REL RATE | AVG RATE MG/L/HR |
|---|---|---|

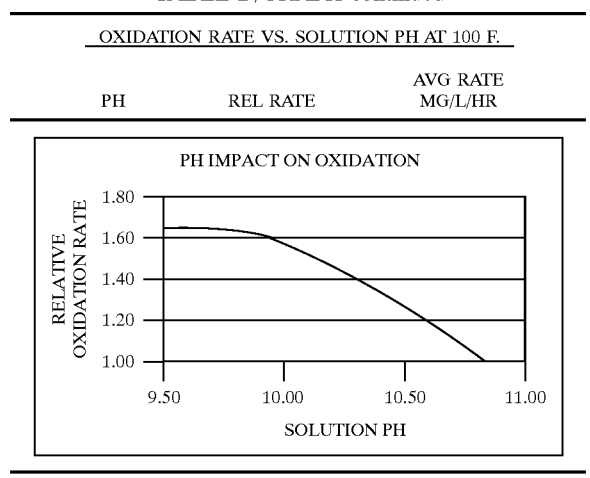

With these factors in mind, the process for removing minor sulfide products, specifically $H_2S$ and $CO_2$ from a sour gas mixture is described below with reference to the flow scheme shown in FIG. 1.

Referring to the process flow scheme shown in FIG. 1, a stream of an aqueous alkaline solution (20) comprising at least a 10 to 1 molar ratio of an oxidizing agent to hydrogen sulfide in the gaseous mixture at a temperature of about 150 degrees F. to 300 degrees F. is pumped into Absorber (10). Also entering the Absorber (10) is a stream of sour gas (30), entering preferably at the bottom of the Absorber (10). The aqueous alkaline solution (20) and the stream of sour gas (30) is contacted in the Absorber (10). The aqueous alkaline solution preferably contacts the sour gas counter currently so that the sour gas (30) is absorbed into the aqueous alkaline solution (20). The pressure of the Absorber (10) is held above atmospheric pressure to assure that the sour gas (30) is absorbed into the alkaline aqueous solution (20). Once the sour gas is absorbed into the alkaline aqueous solution (20) the $CO_2$ present in the sour gas reacts with potassium carbonate to produce potassium bicarbonate $KHCO_3$. Where the absorption of $H_2S$ produces $KHCO_3$ and potassium hydrogen sulfide (KHS).

Since the oxidizing agent, $V^{+5}$ is about 10 times the loading concentration of $H_2S$, the $H_2S$ is immediately oxidized into elementary sulfur. Formation of one mole of sulfur converts two moles $V^{+5}$ to $V^{+4}$. The excess $V^{+5}$ and elevated temperature ensures sulfur oxidation and therefore as stated above, minimizes the formation of sulfur by-products, such as potassium thiosulfate. Once elementary sulfur is removed from the gaseous mixture and is dissolved in the alkaline aqueous solution, the gas (40) is released from the top of the Absorber (10). This gas (40) has reduced $CO_2$ and minimal $H_2S$, preferably between 1–4 ppmv.

At this point the aqueous alkaline solution contains elementary sulfur, a higher concentration of $KHCO_3$ and lower concentration of $V^{+5}$ than prior to the absorption of the sour gas. To remove the elementary sulfur efficiently, the aqueous alkaline solution (50) is passed through a mechanical filter (60) which removes almost all of the elementary sulfur present in the solution. For completeness, the aqueous alkaline solution can filtered a second time to assure all sulfur is removed form the solution.

After the sulfur is mechanically filtered out of the solution, an aqueous alkaline solution (60) having less sulfur than the starting solution is produced. The aqueous solution (65) is then pumped to the top of a Stripper (70) for regeneration. The Stripper (70) is maintained at a temperature of between 200 degrees F. to about 300 degrees F. and a pressure of about 1 atmosphere.

Steam (80) from a reboiler (90) enters the bottom of the Stripper (70). As the steam (80) rises and condenses in the Stripper (70), $KHCO_3$ is decomposed first into $K_2CO_3$ and then into $CO_2$. Once $CO_2$ is produced it is then stripped from the aqueous alkaline solution. It is important to maintain the flow of stream (80) entering the stripper (70) so that the pH is maintained below 10. This could be accomplished by placing a pH meter at the middle of the Stripper (70) so that pH can be easily monitored and the steam (80) flow adjusted accordingly. For example, when the pH starts to go above 10, the amount of steam (80) that flows to the Stripper (70) is reduced. Accordingly, when the pH starts to drop below 10, the amount of steam (80) to the Stripper (70) is increased.

After the $CO_2$ is stripped from the aqueous alkaline solution to produce an aqueous alkaline solution containing less sulfur and $CO_2$ than the aqueous alkaline solution and an acid gas (100) that entered the Stripper (70), the acid gas (100) is cooled in acid gas cooler (110). Once the acid gas (100) is cooled, it is passed through a condensate removal unit (170) and is vented to the atmosphere through line (180). The amount of $H_2S$ in the acid gas (100) is normally below 4 ppmv and therefore can be vented into the atmosphere without further treatment. After the acid gas (100) is released, a condensate pump (120) pumps condensate into the reboiler (90) so as to conserve water.

To regenerate $V^{+5}$, part of the aqueous alkaline solution (130) which is present in the Stripper (70) is pumped to a separate Oxidizer (140) where it is mixed with oxygen, preferably air. Oxygen converts the $V^{+4}$ back to $V^{+5}$. Once converted back to $V^{+5}$ the aqueous alkaline solution containing increased levels of $V^{+5}$ is pumped from the Oxidizer (140) to the Absorber (10) where it mixes with the aqueous alkaline solution (20) to be used in the Absorber (10). A booster pump (150) may be used to pump aqueous solution high in $V^{+4}$ to the Oxidizer (140). A solution pump (160) may also be used. This pump moves the aqueous solution that is high in $V^{+5}$ to the Absorber (10) so as to start the $H_2S$ and $CO_2$ removal process all over again. The regeneration of $V^{+5}$ aids in maintaining the $V^{+4}$ concentration above 65% of all vanadium ions without any additional energy expenditure. The fact that no additional energy is required to regenerate $V^{+5}$ for $H_2S$ removal makes the process cost efficient.

Figure 2:
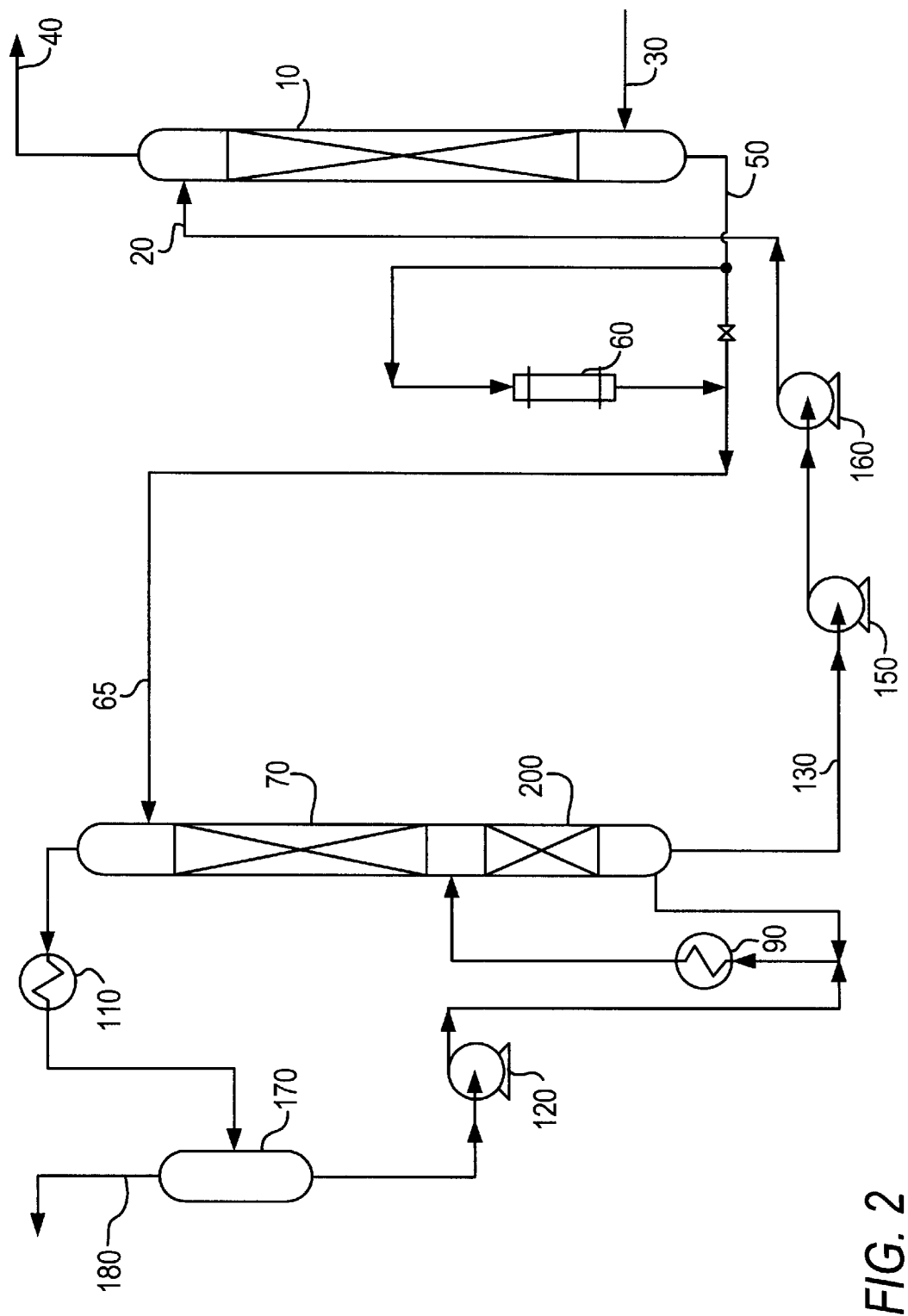
FIG. 2 is similar to the schematic diagram of FIG. 1 except that the oxidation chamber is part of the stripper.

As an alternative, as shown in FIG. 2, the Stripper (70) may contain a packed/trayed section (200) at the bottom of the Stripper (70). This packed/trayed section (200) may take the place of the separate Oxidizer (140) as shown in FIG. 1. A process utilizing this type of oxidizer instead of a separate oxidizer would then pump the aqueous alkaline solution containing the increase concentration of $V^{+5}$ ions back to the Absorber (10) where it can be used to contact incoming sour gas and start the process removal of $H_2S$ and $CO_2$ from sour gas all over again.

Although it is possible to oxidize $V^{+4}$ in the Stripper (70) by injecting oxygen containing gas into the bottom of the Stripper (70) a separate oxidizer is preferred. The separate Oxidizer is preferred because the simultaneous stripping of $CO_2$ causes a substantial amount of stripping gas—mainly steam—to dilute the oxygen content in the gas phase and lower $V^{+4}$ oxidation. Therefore, a separate contact tower, i.e. Oxidizer (140) as shown in FIG. 1, is preferred over regenerating $V^{+4}$ in the Stripper (70).

Any gas that remains in the Oxidizer (140) is sent back into the Stripper (70) to be reused.

Since the majority of $H_2S$ present in the sour gas is oxidized in the aqueous alkaline solution, $CO_2$ from the Stripper (70) contains little if any $H_2S$. Because the $CO_2$ present in the Stripper (70) contains little if any $H_2S$, $CO_2$ can be recovered or released directly into the air, and therefore, does not usually require additional treatment. As stated above, after cooling in the Acid Gas Cooler, $CO_2$ may be vented or reused directly. In addition, the present inventive process is also energy efficient.

In summary, the aforementioned process economically removes $H_2S$ and $CO_2$ from sour gas mixtures and comprises several other appealing features. For example, the direct oxidation of $H_2S$ into elementary sulfur eliminates $H_2S$ equilibrium pressure from the solution, therefore, $H_2S$ removal no longer depends on stripping, which is very energy intensive. In addition, without $H_2S$, acid gas—mainly $CO_2$—from the stripper does not require further treatment and can be safely vented directly into the atmosphere. Finally, since $H_2S$ removal does not depend on stripping, the absence of $CO_2$ will not influence $H_2S$ removal. For these reasons as well as others the $H_2S/CO_2$ removal processes is an improvement over existing stripping processes.

While the invention has been illustrated and described with respect to specific illustrative embodiments and modes of practice, it will be apparent to those skilled in the art that various modifications and improvements may be made without departing from the scope and spirit of the invention. Accordingly, the invention is not to be limited by the illustrative embodiments and modes of practice.

What is claimed is:

1. A process for the removal of hydrogen sulfide and carbon dioxide from a gaseous mixture that contains hydrogen sulfide and carbon dioxide comprising:
    (a) contacting the gaseous mixture with an aqueous alkaline solution comprising about 20% to about 30% by weight $K_2CO_3$, about 0.5% to about 5% by weight $V_2O_5$ and about 0.5% to about 5% by weight $H_3BO_3$ wherein the vanaditum oxidizing agent is in such an amount to provide at least a 10 to 1 molar ratio of the vanadium oxidizing agent to hydrogen sulfide in the gaseous mixture at a temperature of about 150 degrees F. to about 300 degrees F. thereby absorbing hydrogen sulfide and carbon dioxide into the aqueous alkaline solution;
    (b) oxidizing $H_2S$ in the aqueous alkaline solution to elemental sulfur;
    (c) removing elemental sulfur from the aqueous alkaline solution; and
    (d) stripping $CO_2$ from the aqueous alkaline solution.

2. A process according to claim 1 wherein the pH of the aqueous alkaline solution is controlled through steam stripping to a pH below 10.

3. A process according to claim 2 wherein the pH of the aqueous alkaline solution is controlled through steam stripping to a pH of about 8.5 to about 10.

4. A process according to claim 1 wherein the gaseous mixture is contacted with the aqueous alkaline solution in an absorber and the pressure of the absorber is above atmospheric pressure.

5. A process according to claim 4 wherein the $CO_2$ is stripped in a stripper, the stripper further comprising an oxidation section containing oxygen whereby tetra-valent vanadium is converted back to penta-valent vanadium.

6. A process according to claim 5 wherein the amount of tetra-valent vanadium in the alkaline aqueous solution is maintained above about 65% of the total vanadium ions.

7. A process according to claim 5 wherein steam is provided to the stripper thereby keeping the aqueous alkaline solution below a pH of 10 during the process of stripping $CO_2$ from the aqueous alkaline solution.

8. A process according to claim 5 wherein the aqueous alkaline solution produced after $CO^2$ is at least partially removed is recycled back to the absorber to combine with additional aqueous alkaline solution and gaseous mixture entering the process.

9. A process according to claim 5 wherein oxygen containing gas is injected into the bottom of the stripper.

10. A process according to claim 9 wherein the oxygen containing gas is pumped into either a separate contact tower or a packed/trayed section in the bottom of the stripper.

11. A process according to claim 1 wherein the gaseous mixture is contacted with the aqueous alkaline solution counter-currently.

12. A process according to claim 1 wherein the gaseous mixture is contacted at a temperature of about 175° F.–250° F.

13. A process according to claim 1 wherein the gas stripped from the stripper in step (d) is cooled in an acid gas cooler and vented to the atmosphere.

14. A process according to claim 13 wherein the aqueous alkaline solution from the stripper is pumped to an oxidizer whereby $V^{+4}$ in the aqueous solution is converted to $V^{+5}$ and an aqueous alkaline solution having elevated $V^{+5}$ is generated.

15. A process according to claim 14 wherein the aqueous alkaline solution having elevated $V^{+5}$ is pumped to the absorber where it contacts incoming gaseous mixture, thereby recycling the aqueous alkaline solution containing $V^{+5}$.

16. A process according to claim 1 wherein the percentage of tetra-valent vanadium in the alkaline aqueous solution is maintained above about 65% of the total vanadium ions.

17. A process according to claim 16 wherein the gaseous mixture is contacted at a temperature of about 175° F.–250° F.

* * * * *

UNITED STATES PATENT AND TRADEMARK OFFICE
CERTIFICATE OF CORRECTION

PATENT NO. : 6,485,697 B1  
DATED : November 26, 2002  
INVENTOR(S) : I-Meen Chao It is certified that error appears in the above-identified patent and that said Letters Patent is hereby corrected as shown below:

Column 9,  
Line 6, change "$CO^2$" to -- $CO_2$ --.

Signed and Sealed this

Eleventh Day of March, 2003

JAMES E. ROGAN  
*Director of the United States Patent and Trademark Office*